United States Patent [19]
Konishi

[11] Patent Number: 6,034,825
[45] Date of Patent: *Mar. 7, 2000

[54] OBJECTIVE LENS SYSTEM

[75] Inventor: Hirokazu Konishi, Hachioji, Japan

[73] Assignee: Olympus Optical Co., Ltd., Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/760,313

[22] Filed: Dec. 4, 1996

[30] Foreign Application Priority Data

Dec. 4, 1995 [JP] Japan .................................... 7-337715

[51] Int. Cl.[7] ........................................................ G02B 3/00
[52] U.S. Cl. .............................................................. 359/654
[58] Field of Search ...................................... 359/652, 654

[56] References Cited

U.S. PATENT DOCUMENTS 4,783,154   11/1988   Takahashi ................................ 359/654

FOREIGN PATENT DOCUMENTS

| 59-062816 | 4/1984 | Japan . |
| 59-062817 | 4/1984 | Japan . |
| 62-031817 | 2/1987 | Japan . |
| 63-124011 | 5/1988 | Japan . |
| 6-003598 | 1/1994 | Japan . |

*Primary Examiner*—Scott J. Sugarman
*Attorney, Agent, or Firm*—Pillsbury Madison & Sutro LLP

[57] ABSTRACT

An objective lens system comprising a first lens unit composed of a cemented lens component which comprises a plurality of radial type gradient index lens elements having refractive indices varying dependently on distances as measured from an optical axis, wherein a gradient index lens element disposed on the object side has a concave surface on the object side. This objective lens system favorably corrects longitudinal chromatic aberration, offaxial aberrations and chromatic aberration, and is configured so as to facilitate the manufacture of the gradient index lens elements in practice.

16 Claims, 2 Drawing Sheets

OBJECTIVE LENS SYSTEM

BACKGROUND OF THE INVENTION a) Field of the Invention

The present invention relates to an objective lens system using gradient index lens elements which have refractive indices varying dependently on distances as measured from an optical axis in a radial direction.

b) Description of the Prior Art

For sufficiently correcting aberrations such as spherical aberration, coma, curvature of field and chromatic aberration in an objective lens system, it is necessary to use a large number of lens elements, thereby leading to an increased manufacturing cost of a lens system.

As means for correcting this defect, it is known to use a gradient index lens elements which have larger freedom for correction of aberrations than homogeneous lens elements. As conventional examples of objective lens systems using gradient index lens elements, there are known objective lens systems disclosed by Japanese Patents Kokai Publication No. Sho 59-62816 and No. Sho 59-62817 each of which use a cemented lens component consisting of gradient index lens elements having refractive indices varying dependently on distances as measured from an optical axis in a radial direction and are cemented to each other. These conventional examples are configured as lens systems in which spherical aberration of monochromatic light and coma are corrected.

Further, a lens system disclosed by Japanese Patent Kokai Publication No. Sho 63-124011 is known as a lens system in which chromatic aberration of white light is corrected.

Furthermore, known as examples of objective lens systems for microscopes using gradient index lens elements are a lens system disclosed by Japanese Patent Kokai Publication No. Sho 62-31817 which is composed of three lens components and a lens system disclosed by Japanese Patent Kokai Publication No. Hei 6-3598 which is composed of two lens components.

Each of the above-mentioned Japanese Patents Kokai Publication No. Sho 59-62816 and No. Sho 59-62817 describes correction of aberrations of monochromatic light, but makes no reference to correction of chromatic aberration of white light. Japanese Patent Kokai Publication No. Sho 63-124011 describes correction of chromatic aberration of white light, but the lens system disclosed by this patent cannot correct chromatic aberration sufficiently as it has a large numerical aperture due to a fact that gradient index lens elements have small values of $V_{1 0}$. These gradient index lens elements can hardly be manufactured in practice since they have axial and offaxial refractive indices which are largely different from each other.

Moreover, the objective lens system for microscopes disclosed by Japanese Patent Kokai Publication No. Sho 62-31817 is scarcely capable of correcting aberrations sufficiently when it has a large numerical aperture.

In addition, the objective lens system for microscopes disclosed by Japanese Patent Kokai Publication No. Hei 6-3598 can hardly correct aberrations when it has a large numerical aperture. When an attempt is made to configure this objective lens system so as to have a large numerical aperture, gradient index lens elements used in a first lens unit thereof can hardly be manufactured in practice since they have axial and offaxial refractive indices which are largely different from each other.

SUMMARY OF THE INVENTION

A primary object of the present invention is to provide an objective lens system which uses gradient index lens elements having refractive indices varying dependently on distances as measured from an optical axis in a radial direction, favorably corrects axial aberrations, offaxial aberrations and chromatic aberration, and is configured so as to facilitate the manufacture of the gradient index lens elements.

The objective lens system according to the present invention comprises a first lens unit composed of a cemented lens component comprising at least one gradient index lens element which has a concave surface on the object side and a refractive index varying dependently on distances as measured from the optical axis in the radial direction, and another gradient index lens element cemented to the gradient index lens element described above.

Speaking more concretely, a fist composition of the lens system according to the present invention is an objective lens system wherein the cemented lens component used for composing the first lens unit is a cemented doublet component which is composed, for example, of a radial type gradient index lens element disposed on the object side and having a concave surface on the object side, and another gradient index lens element cemented to the radial type gradient index lens element, or a cemented triplet component which is composed, in order from the object side, of a radial type gradient index lens element having a concave surface on the object side, another gradient index lens element and a homogeneous lens element cemented to one another.

A second composition objective lens system according to the present invention is a lens system further comprising a second lens unit comprising a gradient index lens element and disposed on the image side of the first lens unit having the composition described above.

DETAILED DESCRIPTION OF THE PREFERRED EMBODIMENTS

Figure 1:
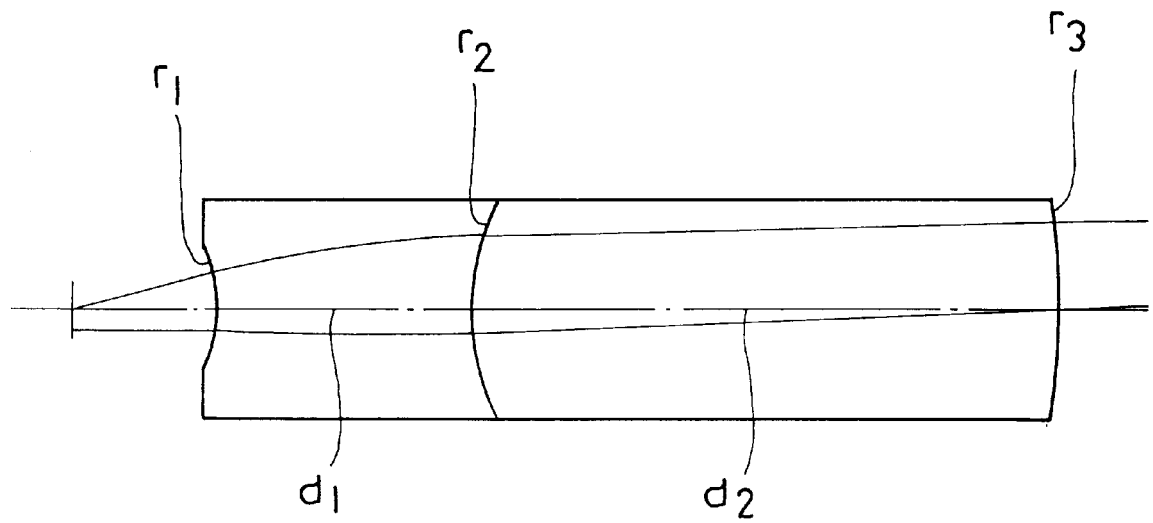
FIG. 1 is a sectional view illustrating a composition of a first embodiment of the objective lens system according to the present invention.

A first embodiment of the objective lens system according to the present invention is a lens system comprising a first lens unit composed of a cemented lens component consisting of at least two gradient index lens elements which are cemented to each other and include a gradient index lens element having a refractive index distribution. The refractive index of the gradient index lens element varies dependently on distances as measured from an optical axis in a radial direction as expressed by the following formula (a):

$$N(r)=N_{00}+N_{10}r^2+N_{20}r^4+ \quad (a)$$

wherein the reference symbol r represents a distance as measured from the optical axis, the reference symbol $N_{00}$ designates a refractive index on the optical axis, and the reference symbols $N_{10}$, $N_{20}$ . . . denote coefficients of the second, fourth, . . . orders respectively.

Generally speaking, an objective lens system must correct aberrations sufficiently favorably while meeting requisites for various specification items such as a working distance, a numerical aperture and a magnification. Accordingly, a large number of lens elements are required for composing the objective lens system, thereby enhancing a manufacturing cost thereof.

When an objective lens system is composed only of homogeneous lens elements, aberrations are produced due to refractions on surfaces of the lens elements and each lens surface must have a large angle of refraction for obtaining a required refractive power with a small number of lens elements, thereby producing aberrations in large amounts. For this reason, a large number of lens elements are used and a small angle of refraction is selected for each lens surface so that it produces aberrations in small amount, thereby correcting aberrations in the objective lens system as a whole.

The objective lens system according to the present invention has the composition described above for reducing a number of lens elements to be disposed therein by using gradient index lens elements having high capabilities to correct aberrations. Speaking concretely, curvature of field is favorably corrected by configuring, so as to have a concave surface on the object side, a gradient index lens element which has a refractive index varying dependently on distances as measured from the optical axis in the radial direction (a radial type gradient index lens element) and chromatic aberration is corrected with a cemented surface of the above-mentioned cemented lens component so that aberrations are corrected with good balance with refractive powers of the gradient index lens elements or with a small number of lens elements in the objective lens system as a whole. For this purpose, the objective lens system according to the present invention is configured as a lens system which comprises the first lens unit having the composition described above on the object side.

For correcting aberrations with good balance in the objective lens system according to the present invention which has the first composition, it is desirable to configure the gradient index lens element disposed on the object side and the gradient index lens element disposed on the image side in the cemented lens component so as to satisfy the following condition (1):

$$N_{10A}<0, N_{10B}<0 \quad (1)$$

wherein the reference symbols $N_{10A}$ and $N_{10B}$ represent coefficients of the second order for refractive indices of the gradient index lens elements disposed on the object side and the image side respectively.

A Petzval's sum of a radial type gradient index lens element is expressed by the following formula (b):

$$P=\phi_S/N_{00}+\phi_M/N_{00}^2 \quad (b)$$

wherein the reference symbols $\phi_S$ and $\phi_M$ represent a refractive power of surface and a refractive power of medium respectively of the radial type gradient index lens element.

Further, the refractive power of medium $\phi_M$ can be approximated by the following formula (c):

$$\phi_M=-2N_{10}d \quad (c)$$

wherein the reference symbol d represents the thickness of the radial type gradient index lens element.

As one can see from the above-mentioned formula (b), the radial type gradient index lens element can correct a Petzval's sum by using the refractive power of medium as a variable such that it has a Petzval's sum smaller than that of a homogeneous lens element which has the same refractive power as that of the radial type gradient index lens element.

For correcting aberrations in the objective lens system according to the present invention as a whole, it is desirable that lens surfaces produce aberrations in small amounts. When curvature of field is also taken into consideration, it is possible to correct aberrations with good balance in the objective lens system as a whole by selecting a negative refractive power of surface and a positive refractive power of medium.

When the gradient index lens elements satisfy the condition (1), the gradient index lens elements have positive refractive powers of medium and a negative refractive powers of surface which share a role in correction aberrations, thereby being capable of reducing the amounts of aberrations be produced by the lens surfaces, as can be seen from the formula (c).

If the above-mentioned condition (1) is not satisfied, the gradient index lens elements will have negative refractive powers of medium and positive refractive powers of surface must be strengthened, whereby the lens surfaces will produce spherical aberration in a large amount and aberrations can hardly be corrected in the objective lens system as a whole.

Further, it is desirable from the formula (c) that each of the gradient index lens elements has a thickness satisfying the following condition (11):

$$d/f_c>0.5 \quad (11)$$

wherein the reference symbol $f_c$ represents a focal length of the cemented lens component.

When each of the gradient index lens elements satisfies the condition (11), the gradient index lens elements have sufficient refractive powers of medium and aberrations to be produced by the medium can be reduced to prevent $N_{10}$ from having a large value, whereby the gradient index lens elements have small differences between the axial and offaxial refractive indices and can easily be manufactured in practice.

For correcting chromatic aberration in the objective lens system according to the first composition of the present invention, the gradient index lens elements that makes up the cemented lens component satisfy the following conditions (2) and (3) respectively:

$$|V_{10A}| > V_{00A} \quad (2)$$

$$|V_{10B}| > V_{00B} \quad (3)$$

wherein the reference symbols $V_{00A}$, $V_{10A}$ and $V_{00B}$, $V_{10B}$ represent Abbe's numbers of distribution coefficients of the object side gradient index lens element and the image side gradient index lens element disposed in the cemented lens component which have values expressed by the following formulae:

$$V_{00} = (N_{00d} - 1)/(N_{00F} - N_{00C})$$

$$V_{10} = N_{10d}/(N_{10F} - N_{10C})$$

wherein the reference symbols $N_{00d}$, $N_{00F}$ and $N_{00C}$ represent refractive indices on the optical axis for the d-line, F-line and C-line respectively, and the reference symbols $N_{10d}$, $N_{10F}$ and $N_{10C}$ designate refractive index distribution coefficients $N_{10}$ for the d-line, F-line and C-line respectively.

Longitudinal chromatic aberration PAC produced by a radial gradient index lens element is expressed by the following formula (d):

$$PAC = k(\phi_S/V_{00} + \phi_M/V_{10}) \quad (d)$$

As seen from this formula, the radial type gradient index lens element produces longitudinal chromatic aberration in an amount proportional to a value in the parentheses in the right side of the formula (d) with a proportionality factor of k.

As seen from the formula (d), longitudinal chromatic aberration produced by a medium can be controlled by varying a value of $V_{10}$.

Now, let us represent $\phi_S$, $\phi_M$, $V_{00}$ and $V_{10}$ of the object side gradient index lens element of the cemented lens component by $\phi_{SA}$, $\phi_{MA}$, $V_{OOA}$ and $V_{10A}$, respectively and designate $\phi_S$, $\phi_M$, $V_{00}$ and $V_{10}$ of the image side gradient index lens element by $\phi_{SB}$, $\phi_{MB}$, $V_{00B}$ and $V_{10B}$, respectively.

Aberrations can be suppressed by weakening a refractive power of surface of a gradient index lens element. For suppressing aberrations, it is desirable that $\phi_{SA}$ which represents a refractive power of surface of the object side gradient index lens element has a value close to 0 and, for reducing longitudinal chromatic aberration. However, $\phi_{MA}$ has a large positive value for correcting aberrations with good balance. Accordingly, it is desirable that $V_{10A}$ has a value satisfying the above-mentioned condition (2) for optimum correction of longitudinal chromatic aberration. For a reason similar to that described above, it is desirable that the image side gradient index lens element satisfies the condition (3).

When the conditions (2) and (3) are satisfied, the terms of $\phi_{MA}$ and $\phi_{MB}$ used in the formula (d) have small values, thereby making it possible to reduce a total amount of longitudinal chromatic aberration. When the conditions (2) and (3) are not satisfied, it is impossible to reduce values of the terms of $\phi_{MA}$ and $\phi_{MB}$, thereby aggravating longitudinal chromatic aberration.

Further, it is desirable that the objective lens system according to the present invention which has the first composition satisfies the following conditions (4) and (5):

$$N_{00A} > N_{00B} \quad (4)$$

$$V_{00A} < V_{00B} \quad (5)$$

Since lens surfaces other than the cemented surface have positive refractive powers for rays having short wavelengths which are stronger than those for rays having long wavelengths and produce chromatic aberration in the objective lens system according to the present invention, the cemented surface is configured so as to produce chromatic aberration in a direction opposite to the chromatic aberration produced by the surfaces other than the cemented surface for correcting chromatic aberration in the objective lens system as a whole. If the cemented surface produces chromatic aberration in the same direction as that of chromatic aberration produced by the other surfaces or if the cemented surface is not used, chromatic aberration must be corrected only with a medium of the gradient index lens elements and chromatic aberration must be produced in a relatively large amount by the medium. For this purpose, a difference between axial and offaxial refractive indices of the medium must be large, but it is difficult to manufacture a glass material which has such a large refractive index distribution. Accordingly, it is desirable that the cemented surface has a negative refractive power for rays having the short wavelengths which is stronger than that for the rays having long wavelengths. The conditions (4) and (5) define requisites for obtaining such a refractive power.

If the condition (4) is not satisfied, it will be impossible to correct chromatic aberration with the cemented surface. If the condition (5) is not satisfied, the cemented surface will have a positive refractive power for rays having the short wavelengths which is stronger than that for rays having the long wavelengths, whereby a difference between axial and offaxial refractive indices must be large for correcting chromatic aberration in the objective lens system as a whole.

Further, it is conceivable to select a second composition described below for the objective lens system according to the present invention. Speaking concretely, the objective lens system according to the present invention is composed, in order from the object side, of a first lens unit composed of a cemented lens component which comprises at least one gradient index lens element having a concave surface on the object side and a refractive index varying dependently on distances as measured from an optical axis in a radial direction (radial type gradient index lens element), and a gradient index lens element cemented thereto; and a second lens unit which comprises at least one gradient index lens element having a refractive index varying dependently on distances as measured from the optical axis in the radial direction.

The second composition described above makes it possible to obtain an objective lens system which has a large numerical aperture. In an objective lens system in which a light bundle emitted from an object is transformed into a converging light bundle by a first lens unit, spherical aberration can hardly be corrected only with the first lens unit when the objective lens system has a large numerical aperture. Therefore, the objective lens system according to the second embodiment of the present invention second embodiment of the corrects residual spherical aberration by disposing, on the image side of the first lens unit, the second lens unit comprising the gradient index lens element. Accordingly, the objective lens system according to the second embodiment of the present invention is capable of favorably correcting spherical aberration though it has a large numerical aperture.

For the objective lens system according to the present invention which has the composition described above, it is desirable that a positive refractive power is imparted to the first lens unit and a negative refractive power is imparted to the second lens unit.

As the objective lens system has a larger numerical aperture, the first lens unit which converges a diverging light bundle must have a stronger positive refractive power and produces negative spherical aberration in a larger amount. For correcting this negative spherical aberration, the second lens unit must have a negative refractive power so that spherical aberration can be corrected in the objective lens system as a whole.

For the objective lens system according to the present invention which has the second composition, it is desirable that the gradient index lens element disposed on the object side and the gradient index lens element disposed on the image side in the cemented lens component which composes the first lens unit satisfy the following condition (6):

$$N_{10A} < 0, N_{10B} < 0 \qquad (6)$$

For the objective lens system according to the present invention which has the second composition, it is desirable that the gradient index lens element disposed on the object side and the gradient index lens element disposed on the image side in the cemented lens component of the first lens unit satisfy the following conditions (7) and (8) respectively:

$$|V_{10A}| > V_{00A} \qquad (7)$$

$$|V_{10B}| > V_{10B} \qquad (8)$$

For the objective lens system according to the present invention which has the second composition, it is desirable that the gradient index lens element disposed on the object side and the gradient index lens element disposed on the image side in the cemented lens component of the first lens unit satisfy the following conditions (9) and (10):

$$N_{00A} > N_{00B} \qquad (9)$$

$$V_{00A} < V_{00B} \qquad (10)$$

Each of the conditions (6), (7), (8), (9) and (10) mentioned above is required for effectively correcting spherical aberration, chromatic aberration and a Petzval's sum.

When the gradient index lens element satisfies one or more of the conditions mentioned above, it is possible to effectively correct spherical aberration, chromatic aberration and a Petzval's sum.

Furthermore, it is desirable for correction of longitudinal chromatic aberration to satisfy the following condition (12):

$$|1/V_{10A}| < 0.01 \qquad (12)$$

When the condition (12) mentioned above is satisfied, the term $\phi_{MA}$ used in the formula (c) has a small value, whereby it is possible to reduce a total amount of longitudinal chromatic aberration. If the condition (12) is not satisfied, it will be impossible to reduce a value of the term $\phi_{MA}$, thereby aggravating longitudinal chromatic aberration.

Moreover, for manufacturing convenience of the gradient index lens element used in the second lens unit of the objective lens system according to the present invention, it is preferable to configure this lens element so as to have two planar side surfaces which are parallel to each other.

In addition, it is desirable that the gradient index lens element disposed on the image side in the cemented lens component of the first lens unit has two planar surfaces which are in parallel with each other.

By configuring the gradient index lens elements so as to have planar surfaces which are parallel to one another as described above, working and adjustment at assembly stage are facilitated, thereby making it possible to lower the manufacturing cost of the objective lens system.

Preferred embodiments of the objective lens system according to the present invention are described below in a term of specific numerical example:

| Embodiment 1 | | | |
|---|---|---|---|
| $f = 18$, $\quad$ NA = 0.25, $\quad$ $\beta = 10x$ | | | |
| $r_1 = -8.63$ | | | |
| $\quad$ $d_1 = 12.822$ (gradient index lens element 1) | | | |
| $r_2 = 13.707$ | | | |
| $\quad$ $d_2 = 29.032$ (gradient index lens element 2) | | | |
| $r_3 = -64.48$ | | | |
| $N_{00}$ | $N_{10}$ | $N_{20}$ | $N_{30}$ |
| gradient index lens element 1 | | | |
| d line $\quad$ 1.75000, | $-0.49653 \times 10^{-2}$, | $0.27479 \times 10^{-4}$, | $-0.10533 \times 10^{-6}$ |
| C line $\quad$ 1.74437, | $-0.49440 \times 10^{-2}$, | $0.27378 \times 10^{-4}$, | $-0.10494 \times 10^{-6}$ |
| F line $\quad$ 1.76312, | $-0.50152 \times 10^{-2}$, | $0.27713 \times 10^{-4}$, | $-0.10623 \times 10^{-6}$ |
| $V_{00} = 40$, $V_{10} = 0.69770 \times 10^2$ | | | |
| gradient index lens element 2 | | | |
| d line $\quad$ 1.65000, | $-0.73967 \times 10^{-4}$, | $0.15565 \times 10^{-5}$, | $0.18936 \times 10^{-8}$ |
| C line $\quad$ 1.64645, | $-0.73969 \times 10^{-4}$, | $0.15508 \times 10^{-5}$, | $0.18866 \times 10^{-8}$ |
| F line $\quad$ 1.65827, | $-0.73961 \times 10^{-4}$, | $0.15698 \times 10^{-5}$, | $0.19098 \times 10^{-8}$ |
| $V_{00} = 55$, $V_{10} = -0.89739 \times 10^4$ | | | |
| $d_1/f = 0.712$, $d_2/f = 1.613$ | | | |

| Embodiment 2 |
|---|
| $f = 9$, $\quad$ NA = 0.5, $\quad$ $\beta = 20x$ |
| $r_1 = -6.904$ |
| $\quad$ $d_1 = 8.101$ (gradient index lens element 1) |
| $r_2 = \infty$ |
| $\quad$ $d_2 = 15.758$ (gradient index lens element 2) |

-continued

Embodiment 2

$r_3 = \infty$
$\quad d_3 = 8.756$
$r_4 = \infty$
$\quad d_4 = 14.274$ (gradient index lens element 3)
$r_5 = \infty$

| | $N_{00}$ | $N_{10}$ | $N_{20}$ | $N_{30}$ |
|---|---|---|---|---|
| gradient index lens element 1 | | | | |
| d line | 1.75000, | $-0.60687 \times 10^{-2}$, | $0.43315 \times 10^{-5}$, | $0.11063 \times 10^{-7}$ |
| C line | 1.74437, | $-0.60687 \times 10^{-2}$, | $0.43314 \times 10^{-5}$, | $0.11063 \times 10^{-7}$ |
| F line | 1.76312, | $-0.60688 \times 10^{-2}$, | $0.43315 \times 10^{-5}$, | $0.11064 \times 10^{-7}$ |

$V_{00} = 40, V_{10} = 0.59063 \times 10^5$

| | | | | |
|---|---|---|---|---|
| gradient index lens element 2 | | | | |
| d line | 1.65000, | $-0.29606 \times 10^{-2}$, | $0.42323 \times 10^{-5}$, | $0.87745 \times 10^{-9}$ |
| C line | 1.64645, | $-0.29520 \times 10^{-2}$, | $0.42323 \times 10^{-5}$, | $0.87744 \times 10^{-9}$ |
| F line | 1.65827, | $-0.29808 \times 10^{-2}$, | $0.42323 \times 10^{-5}$, | $0.87746 \times 10^{-9}$ |

$V_{00} = 55, V_{10} = 0.10252 \times 10^3$

| | | | | |
|---|---|---|---|---|
| gradient index lens element 3 | | | | |
| d line | 1.65000, | $0.39609 \times 10^{-3}$, | $0.23771 \times 10^{-5}$, | $0.56357 \times 10^{-8}$ |
| C line | 1.64512, | $0.39610 \times 10^{-3}$, | $0.23771 \times 10^{-5}$, | $0.56352 \times 10^{-8}$ |
| F line | 1.66137, | $0.39609 \times 10^{-3}$, | $0.23773 \times 10^{-5}$, | $0.56352 \times 10^{-8}$ |

$V_{00} = 40, V_{10} = -0.44663 \times 10^5$
$f_1 = 9.669, d_1/f = 0.838, d_2/f = 1.63$

Embodiment 3

$f = 4.5, \quad NA = 0.65, \quad \beta = 40x$ $r_1 = -6.94$
$\quad d_1 = 8.954$ (gradient index lens element 1)
$r_2 = \infty$
$\quad d_2 = 20.16$ (gradient index lens element 2)
$r_3 = \infty$
$\quad d_3 = 8.655$
$r_4 = \infty$
$\quad d_4 = 10.581$ (gradient index lens element 3)
$r_5 = \infty$

| | $N_{00}$ | $N_{10}$ | $N_{20}$ | $N_{30}$ |
|---|---|---|---|---|
| gradient index lens element 1 | | | | |
| d line | 1.75000, | $-0.61154 \times 10^{-2}$, | $-0.10888 \times 10^{-4}$, | $0.30435 \times 10^{-6}$ |
| C line | 1.74437, | $-0.61153 \times 10^{-2}$, | $-0.10888 \times 10^{-4}$, | $0.30435 \times 10^{-6}$ |
| F line | 1.76312, | $-0.61154 \times 10^{-2}$, | $-6.10888 \times 10^{-4}$, | $0.30436 \times 10^{-6}$ |

$V_{00} = 40, V_{10} = 0.59063 \times 10^5$

| | | | | |
|---|---|---|---|---|
| gradient index lens element 2 | | | | |
| d line | 1.65000, | $-0.32278 \times 10^{-2}$, | $0.51066 \times 10^{-5}$, | $0.54217 \times 10^{-9}$ |
| C line | 1.64645, | $-0.32203 \times 10^{-2}$, | $0.51066 \times 10^{-5}$, | $0.54217 \times 10^{-9}$ |
| F line | 1.65827, | $-0.32454 \times 10^{-2}$, | $0.51067 \times 10^{-5}$, | $0.54218 \times 10^{-9}$ |

$V_{00} = 55, V_{10} = 0.12826 \times 10^3$

| | | | | |
|---|---|---|---|---|
| gradient index lens element 3 | | | | |
| d line | 1.65000, | $0.32002 \times 10^{-2}$, | $0.39891 \times 10^{-5}$, | $0.96981 \times 10^{-7}$ |
| C line | 1.64512, | $0.32002 \times 10^{-2}$, | $0.39890 \times 10^{-5}$, | $0.96973 \times 10^{-7}$ |
| F line | 1.66137, | $0.32001 \times 10^{-2}$, | $0.39894 \times 10^{-5}$, | $0.97001 \times 10^{-7}$ |

$V_{00} = 40, V_{10} = -0.44663 \times 10^5$
$f_1 = 7.834, d_1/f = 1.143, d_2/f = 2.57$ wherein the reference symbols $r_1, r_2, \ldots$ represent radii of curvature on surfaces of respective lens elements, and the reference symbols $d_1, d_2, \ldots$ designate thicknesses of the respective lens elements and air-spaces reserved therebetween.

Out of the embodiments described above, the first embodiment has a composition illustrated in FIG. 1, wherein an objective lens system is composed of a first lens unit which is composed of a cemented lens component consisting of two radial type gradient index lens elements cemented to each other.

Figure 2:
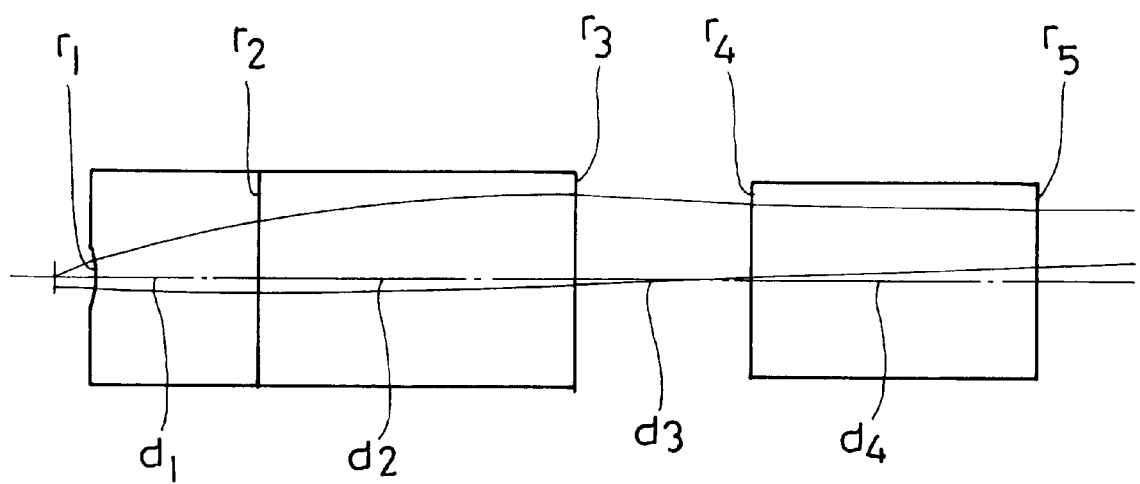
FIG. 2 is a sectional view illustrating a composition of a second embodiment of the objective lens system according to the present invention.
Figure 3:
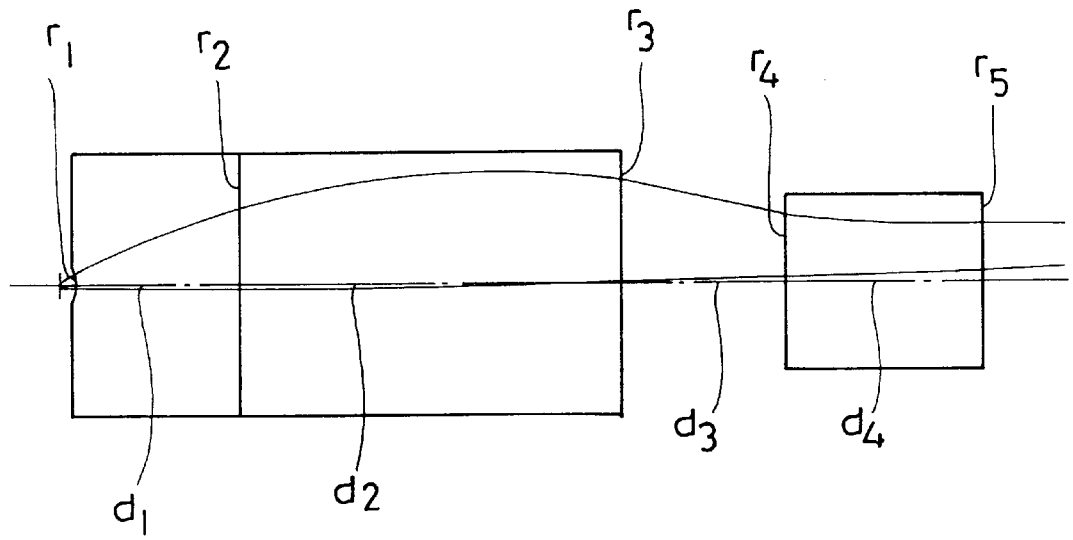
FIG. 3 is a sectional view illustrating a composition of a third embodiment of the objective lens system according to the present invention.

The second and third embodiments have compositions illustrated in FIG. 2 and FIG. 3 respectively. Each of the objective lens system preferred as the second and third embodiments is composed of a first lens unit which is composed of a cemented lens component consisting of two radial type gradient index lens elements cemented to each other, and a second lens unit which is disposed with an airspace reserved from the first lens unit and composed of a radial type gradient index lens element.

Figure 4:
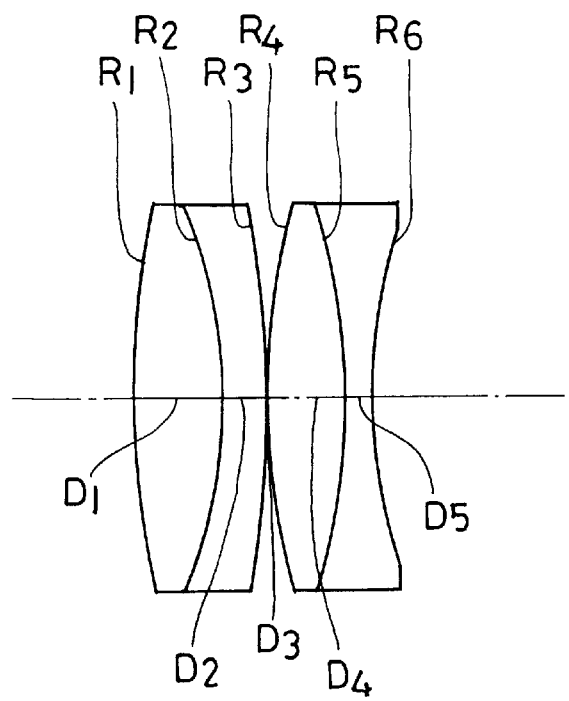
FIG. 4 shows a sectional view exemplifying an imaging lens system which is to be used with the objective lens system according to the present invention.

Each of the first, second and third embodiments is an objective lens system which has aberrations corrected for infinite image distance and is to be used in combination, for example, with an imaging lens system shown in FIG. 4. This imaging lens system has numerical data which is listed below:

$R_1 = 68.7541$
$\quad D_1 = 7.7321 \quad N_1 = 1.48749 \quad V_1 = 70.20$
$R_2 = -37.5679$
$\quad D_2 = 3.4742 \quad N_2 = 1.80610 \quad V_2 = 40.95$
$R_3 = -102.8477$
$\quad D_3 = 0.6973$
$R_4 = 84.3099$
$\quad D_4 = 6.0238 \quad N_3 = 1.83400 \quad V_3 = 37.16$
$R_5 = -50.7100$
$\quad D_5 = 3.0298 \quad N_4 = 1.64450 \quad V_4 = 40.82$
$R_6 = 40.6619$ wherein the reference symbols $R_1, R_2, \ldots$ represent radii of curvature on surfaces of respective lens elements of the imaging lens system, the reference symbols $D_1, D_2, \ldots$ designate thickness of the respective lens elements and an airspace reserved therebetween, and the reference symbols $V_1, V_2, \ldots$ denote Abbe's numbers of the respective lens elements.

The first lens unit used in each of the first, second and third embodiments is composed of a cemented lens component which consists of two radial type gradient index lens elements cemented to each other. However, a homogeneous lens element may be cemented to the image side of the cemented lens component used as the first lens unit to compose a cemented lens component which consists of three lens elements and it is easy, on the basis of the embodiments described above, to obtain an objective lens system which accomplishes the object of the present invention by using such a cemented lens component as a first lens unit.

The objective lens system according to the present invention performs optimum correction of paraxial aberrations, offaxial aberrations and chromatic aberration by using a cemented lens component composed of two gradient index lens elements including one which has a refractive index varying dependently on distances as measured from an optical axis in a radial direction.

I claim:

1. An objective lens system comprising:
   a first lens unit comprising a cemented lens component which comprises a plurality of radial type gradient index lens elements having refractive indices varying dependently on distances as measured from an optical axis as expressed by the formula (a) shown below,
   wherein one of the radial type gradient index lens elements is disposed on the object most side beyond which there is no lens element of said objective lens system, and the radial type gradient index lens disposed on the object most side has a concave surface on the object side, and $$N(r)=N_{00}+N_{10}r^2+N_{20}r^4+ \qquad (a)$$

wherein said objective lens system emits parallel rays, and
   wherein the reference symbol r represents a distance as measured from the optical axis in a radial direction, the reference symbol $N_{00}$ designates a refractive index on the optical axis, and the reference symbols $N_{10}$, $N_{20}$, . . . denote coefficients of the second, fourth, . . . orders, respectively.

2. An objective lens system according to claim 1, wherein said gradient index lens element disposed on the object most side and another gradient index lens element cemented to said gradient index lens element disposed on the object most side satisfy the following condition (1):

$$N_{10A}<0$$
   $$N_{10B}<0 \qquad (1)$$

wherein the reference symbols $N_{10A}$ and $N_{10B}$ represent coefficients of the second order for said gradient index lens element disposed on the object most side and said other gradient index lens element, respectively.

3. An objective lens system according to claim 1, satisfying the following condition (11):

$$d/f_c>0.5 \qquad (11)$$

wherein the reference symbol d represents thickness of each of said gradient index lens elements and the reference symbol $f_c$ designates a focal length of said cemented lens component.

4. An objective lens system according to claim 1, wherein said gradient index lens element disposed on the object most side and said other gradient index lens element satisfy the following conditions (2) and (3):

$$|V_{10A}|>V_{00A} \qquad (2)$$
   $$|V_{10B}|>V_{00B} \qquad (3)$$

wherein the reference symbols $V_{00A}$, $V_{10A}$ and $V_{00B}$, $V_{10B}$ represent Abbe's numbers of said gradient index lens element disposed on the object most side and said other gradient index lens element which have values given by the formulae shown below:

$$V_{00}=(N_{00d}-1)/(N_{00F}-N_{00C})$$
   $$V_{10}=N_{10d}/(N_{10F}-N_{10C})$$

wherein the reference symbols $N_{00d}$, $N_{00F}$ and $N_{00C}$ represent refractive indices on the optical axis for the d-line, F-line and C-line, respectively, and the reference symbols $N_{10}d$, $N_{10F}$ and $N_{10C}$ designate refractive index distribution coefficients $N_{10}$ for the d-line, F-line and C-line, respectively.

5. An objective lens system according to claim 1, wherein said gradient index lens element disposed on the object most side and said other gradient index lens element satisfy the following conditions (4) and (5):

$$N_{00A}>N_{00B} \qquad (4)$$
   $$V_{00A}<V_{00B} \qquad (5)$$

wherein the reference symbols $N_{00A}$ and $V_{00A}$ represent a refractive index and an Abbe's number on the optical axis of said gradient index lens element disposed on the object most side, and the reference symbols $N_{00B}$ and $V_{00B}$ designate a refractive index and an Abbe's number on the optical axis of said other gradient index lens element.

6. An objective lens system according to claim 1, 2, 4 or 5, wherein a second lens unit comprising a radial type gradient index lens element is disposed on the image side of said first lens unit.

7. An objective lens system according to claim 6, wherein said first lens unit has a positive power and said second lens unit has a negative power.

8. An objective lens system according to claim 6, satisfying the following condition (12):

$$|1/V_{10A}|<0.01 \qquad (12)$$

wherein the reference symbol $V_{10A}$ represents an Abbe's number of the gradient index lens element disposed on the object most side in said first lens unit which is given by the formula shown below:

$$V_{10}=N_{10d}/(N_{10F}-N_{10C})$$

wherein the reference symbols $N_{10d}$, $N_{10F}$ and $N_{10C}$ represent refractive index distribution coefficients of the second order $N_{10}$ for the d-line, F-line and C-line, respectively.

9. A lens system comprising:
   an objective lens system; and
   an imaging lens,
   wherein said objective lens system comprises:
   a first lens unit comprising a cemented lens component which comprises a plurality of radial type gradient index lens elements having refractive indices varying dependently on the distances as measured from an optical axis as expressed by a formula (a) shown below;

wherein a gradient index lens element disposed on the object side in said first lens unit has a concave surface on the object side, and wherein said imaging lens forms a real image of an object as a whole including said objective lens system, said formula (a) being $$N(r)=N_{00}+N_{10}r^2+N_{20}r^4+ \tag{a}$$

wherein the reference symbol r represents a distance as measured from the optical axis in a radial direction, the reference symbol $N_{00}$ designates a refractive index on the optical axis, and the reference symbols $N_{10}, N_{20} \ldots$ denote coefficients of the second, fourth, . . . orders, respectively.

10. A lens system according to claim 9, wherein said gradient index lens element disposed on the object side and another gradient index lens element cemented to said gradient index lens element disposed on the object side satisfy the following condition (1):

$$N_{10A}<0$$

$$N_{10B}<0 \tag{1}$$

wherein the reference symbols $N_{10A}$ and $N_{10B}$ represent coefficients of the second order for said gradient index lens element disposed on the object side and said other gradient index lens element respectively.

11. An objective lens system according to claim 9, satisfying the following condition (11):

$$d/f_c>0.5 \tag{11}$$

wherein the reference symbol d represents thickness of each of said gradient index lens elements and the reference symbol $f_c$ designates a focal length of said cemented lens component.

12. A lens system according to claim 9, wherein said gradient index lens element disposed on the object side and said other gradient index lens element satisfy the following conditions (2) and (3):

$$|V_{10A}|>V_{00A} \tag{2}$$

$$|V_{10B}|>V_{00B} \tag{3}$$

wherein the reference symbols $V_{00A}, V_{10A}$ and $V_{00B}, V_{10B}$ represent Abbe's numbers of said gradient index lens element disposed on the object side and said other gradient index lens element which have values given by the formulae shown below:

$$V_{00}=(N_{00d}31\ 1)/(N_{00F}-N_{00C})$$

$$V_{10}=N_{10d}/(N_{10F}-N_{10C})$$

wherein the reference symbols $N_{00d}$, $N_{00F}$ and $N_{00C}$ represent refractive indices on the optical axis for the d-line, F-line and C-lines respectively, and the reference symbols $N_{10d}$, $N_{10F}$ and $N_{10C}$ designate refractive index distribution coefficients $N_{10}$ for the d-line, F-line and C-line, respectively.

13. A lens system according to claim 9, wherein said gradient index lens element disposed on the object most side and said other gradient index lens element satisfy the following conditions (4) and (5):

$$N_{00A}>N_{00B} \tag{4}$$

$$V_{00A}<V_{00B} \tag{5}$$

wherein the reference symbols $N_{00A}$ and $V_{00A}$ represent a refractive index and an Abbe's number on the optical axis of said gradient index lens element disposed on the object most side, and the reference symbols $N_{00B}$ and $V_{00B}$ designate a refractive index and an Abbe's number on the optical axis of said other gradient index lens element.

14. A lens system according to claim 12 or 13, wherein a second lens unit comprising a radial type gradient index lens element is disposed on the image side of said first lens unit.

15. A lens system according to claim 14, wherein said first lens unit has a positive power and said second lens unit has a negative power.

16. A lens system according to claim 14, satisfying the following condition (12):

$$|1/V_{10A}|<0.01 \tag{12}$$

wherein the reference symbol $V_{10A}$ represents an Abbe's number of the gradient index lens element disposed on the object most side in said first lens unit which is given by the formula shown below:

$$V_{10}=N_{10d}/(N_{10F}-N_{10C})$$

wherein the reference symbols $N_{10d}$, $N_{10F}$ and $N_{10C}$ represent refractive index distribution coefficients of the second order $N_{10}$ for the d-line, F-line and C-line, respectively.

* * * * *